(12) United States Patent
Yuasa

(10) Patent No.: US 8,032,077 B2
(45) Date of Patent: Oct. 4, 2011

(54) WIRELESS COMMUNICATION DEVICE

(75) Inventor: Tomokazu Yuasa, Akishima (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/728,793

(22) Filed: Mar. 22, 2010

(65) Prior Publication Data

US 2010/0323761 A1 Dec. 23, 2010

(30) Foreign Application Priority Data

Jun. 18, 2009 (JP) .............................. P2009-145857

(51) Int. Cl.
*H04H 40/00* (2008.01)
(52) U.S. Cl. ...... 455/3.06; 455/3.01; 455/411; 455/425; 455/550.1; 455/556.1; 455/557; 455/559; 348/723; 348/724; 348/14.02; 725/81; 725/100; 725/110; 725/117; 725/118; 725/119; 725/131; 725/151; 709/227; 709/228; 709/245; 709/250; 370/338; 370/389; 370/392; 370/401
(58) Field of Classification Search .................. 455/3.01, 455/3.06, 410, 411, 424, 425, 550.1, 556.1, 455/556.2, 557, 559, 566; 348/723, 724, 348/725, 726, 729, 14.01, 14.02, 14.03; 725/62, 725/64, 67, 68, 78, 81, 85, 110, 117, 118, 725/119, 121, 123, 131, 151, 100; 370/310, 370/338, 389, 392, 395.2, 401, 474; 709/221–228, 709/231, 232, 245, 250
See application file for complete search history.

(56) References Cited

U.S. PATENT DOCUMENTS

| | | | | |
|---|---|---|---|---|
| 7,127,541 B2 * | 10/2006 | Govindarajulu et al. | ..... | 710/300 |
| 7,499,462 B2 * | 3/2009 | MacMullan et al. | .......... | 370/401 |
| 7,849,218 B2 * | 12/2010 | Funabiki et al. | .............. | 709/245 |
| 7,904,593 B2 * | 3/2011 | Ohkita | ........................ | 709/245 |
| 2005/0105498 A1 * | 5/2005 | Hardacker et al. | ............. | 370/338 |
| 2006/0212911 A1 * | 9/2006 | MacMullan et al. | ............ | 725/81 |
| 2008/0278567 A1 * | 11/2008 | Nakajima | ................... | 348/14.02 |
| 2009/0049498 A1 * | 2/2009 | Li | ................... | 725/127 |
| 2009/0260043 A1 * | 10/2009 | Tatsuta et al. | ................... | 725/81 |
| 2009/0278993 A1 * | 11/2009 | Nishikawa et al. | ............ | 348/723 |
| 2009/0322948 A1 * | 12/2009 | Funabiki et al. | .............. | 348/571 |

(Continued)

FOREIGN PATENT DOCUMENTS

JP 2005-244476 9/2005

(Continued)

OTHER PUBLICATIONS

Notification of Reasons for Refusal issued by the Japanese Patent Office on May 25, 2010 in Japanese Patent Application 2009-145857 with English Translation (8 pages total).

*Primary Examiner* — Olumide T Ajibade Akonai
(74) *Attorney, Agent, or Firm* — Finnegan, Henderson, Farabow, Garrett & Dunner, L.L.P.

(57) ABSTRACT

According to an aspect of the present invention, there is provided a wireless communication device including: a cable port to which an external device is connected; a reading unit that reads identification information from the external device; a determination unit that determines whether the external device is the source-side wireless communication device; an authentication memory unit that performs an authentication process with the source-side wireless communication device; a wireless communication unit that performs a wireless communication with the source-side wireless communication device; and a physical address processing unit that controls the source-side wireless communication device to store a physical address of a source-side device calculated based on from the read identification information of the sink-side device.

3 Claims, 4 Drawing Sheets

U.S. PATENT DOCUMENTS

2010/0289872 A1 * 11/2010 Funabiki et al. .................. 348/43

FOREIGN PATENT DOCUMENTS

| | | |
|---|---|---|
| JP | 2006-323707 | 11/2006 |
| JP | 2007-027807 | 2/2007 |
| JP | 2007-214952 | 8/2007 |
| JP | 2008-153826 | 7/2008 |
| JP | 2008-153827 | 7/2008 |
| JP | 2008-295069 | 12/2008 |
| WO | WO 2007/136037 A1 | 11/2007 |

* cited by examiner

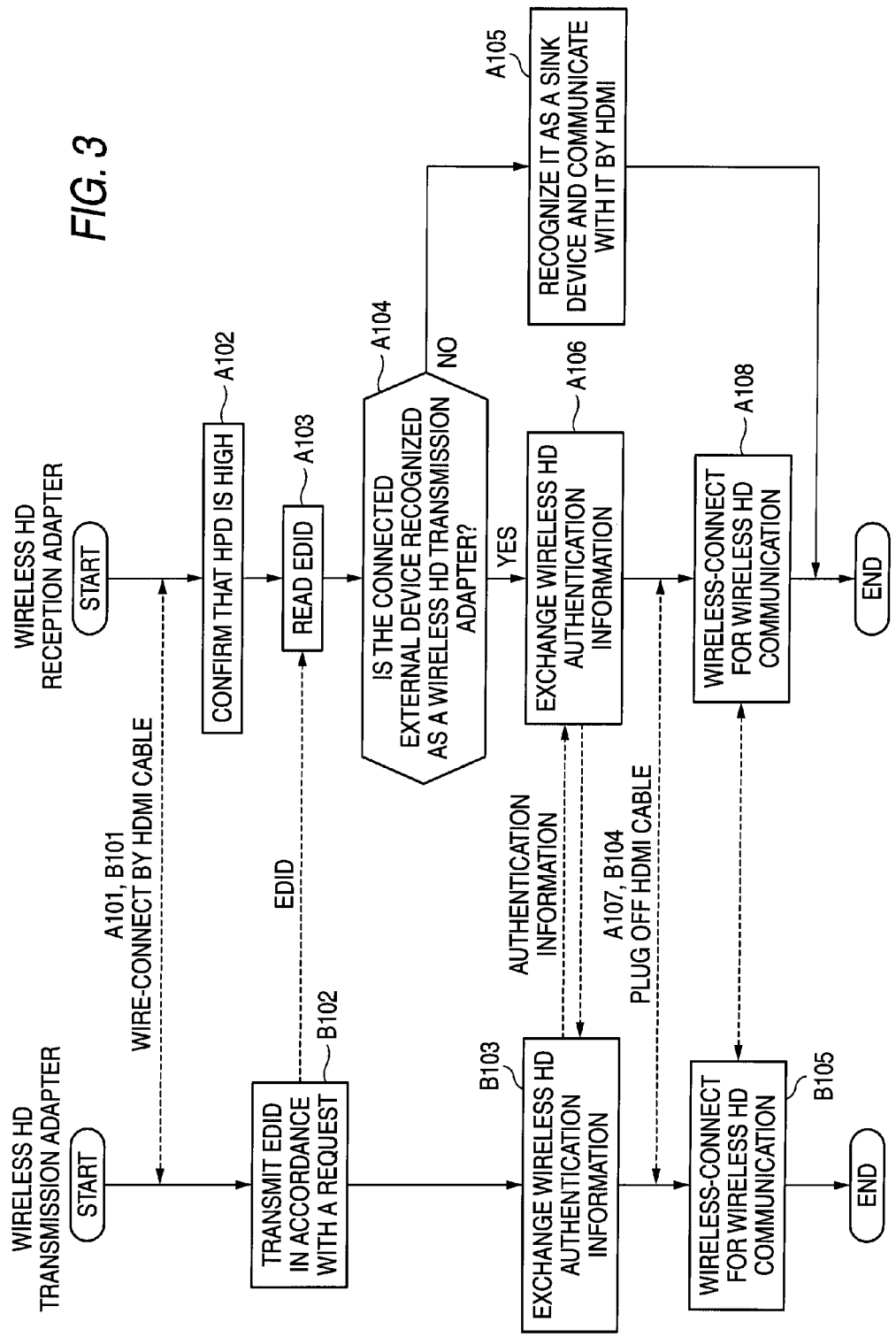

WIRELESS COMMUNICATION DEVICE

CROSS-REFERENCE TO RELATED APPLICATIONS

This application is based upon and claims the benefit of priority from Japanese Patent Application No. 2009-145857, filed on Jun. 18, 2009, the entire contents of which are incorporated herein by reference.

BACKGROUND

1. Field

An aspect of the present invention relates to a wireless communication device.

2. Description of the Related Art

A system for wirelessly transmitting and receiving a picture signal or the like has been conceived in recent years. Generally, authentication information is required in wireless communication in view of security etc. However, if such authentication information is transmitted as a wireless signal, the authentication information will be acquired by another device.

Therefore, an idea of exchanging authentication information by wired communication has been thought of (e.g. see JP-2005-244476-A). JP-2005-244476-A discloses a technique of exchanging authentication information through a wired interface to safely and surely perform registration and authentication of a partner device, before wirelessly communicating a content signal.

In JP-A-2005-244476, communication is performed through a wired interface of HDMI (High Definition Multimedia Interface), and identification information or key information is transmitted through a DDC (Display Data Channel) line or CEC (Consumer Electronics Control) line of the HDMI.

However, in JP-2005-244476-A, communication of identification information or key information is performed in response to an input of a command or a manipulation of a switch. That is, unless a user inputs a command or pushes a switch intentionally, communication of identification information or key information cannot be performed, thereby troubling user.

BRIEF DESCRIPTION OF THE DRAWINGS

A general architecture that implements the various feature of the present invention will now be described with reference to the drawings. The drawings and the associated descriptions are provided to illustrate embodiments of the present invention and not to limit the scope of the present invention.

FIG. 3 illustrates an exemplary processing flow in a wireless communication device according to the embodiment.

DETAILED DESCRIPTION

Various embodiments according to the present invention will be described hereinafter with reference to the accompanying drawings. In general, according to one embodiment of the present invention, there is provided a wireless communication device including: a cable port to which an external device is connected through a high-functional cable, the external device having a memory storing identification information, the identification information being compatible with the high-functional cable, the external device being a source-side wireless communication device or a sink-side device; a reading unit that reads the identification information from the memory of the external device, when the external device is connected to the cable port; a determination unit that determines whether the external device is the source-side wireless communication device or not based on the identification information, when the external device is connected to the cable port; an authentication memory unit that performs an authentication process with the external device to acquire authentication information and that stores the acquired authentication information, when the source-side wireless communication device is connected to the cable port as the external device; a wireless communication unit that performs a wireless communication with the source-side wireless communication device based on the authentication information stored in the authentication memory unit; and a wired physical address processing unit that controls the source-side wireless communication device to store a physical address of a source-side device to be wired to the source-side wireless communication device into the memory thereof when the sink-side device is connected to the cable port as the external device, the physical address being calculated based on a physical address included in the read identification information.

A wireless communication device according to an embodiment will be described below with reference to the drawings.

Figure 1A:
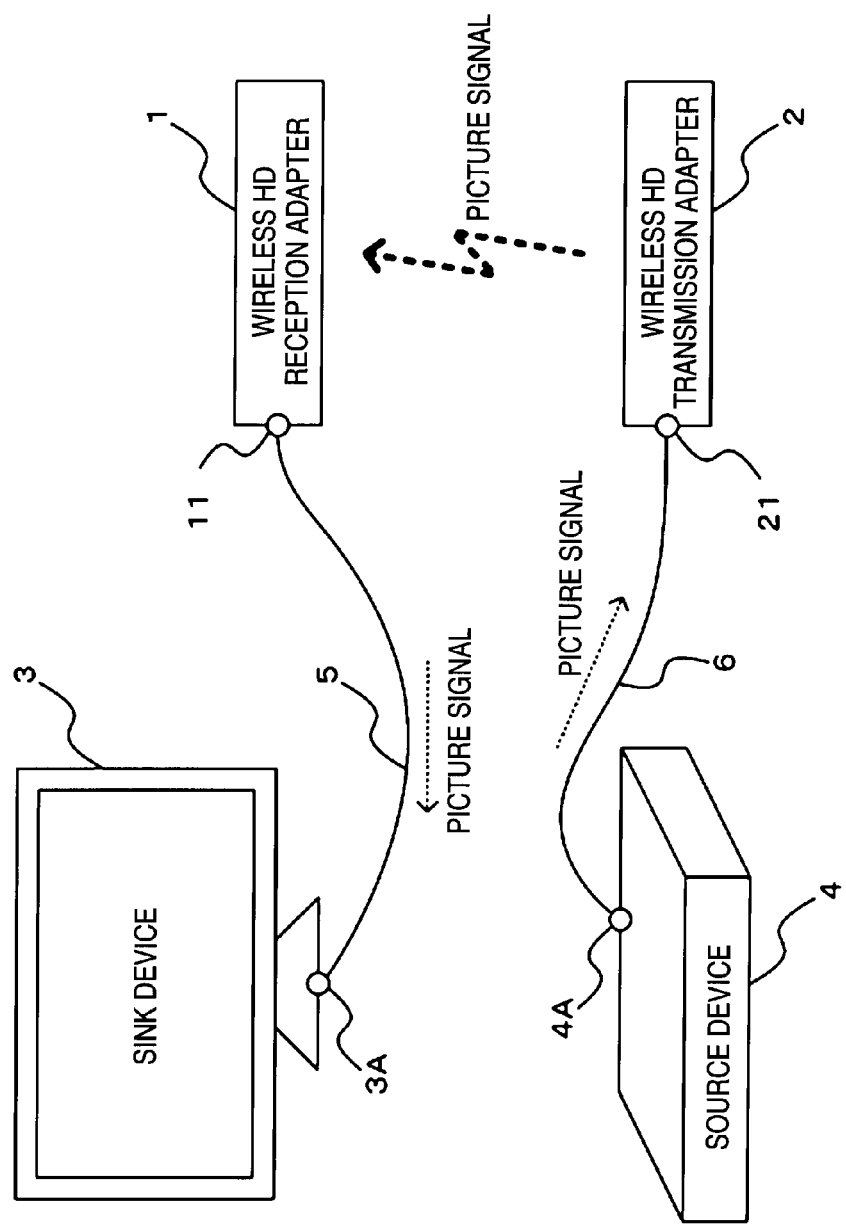
FIGS. 1A and 1B illustrate a wireless communication system using a wireless communication device according to an embodiment.

A system including a wireless HD reception adapter and a wireless HD transmission adapter as a wireless communication device according to the embodiment will be described first with reference to FIGS. 1A and 1B.

This communication system includes a wireless HD reception adapter 1, a wireless HD transmission adapter 2, a sink device 3, and a source device 4. FIG. 1A is a diagram showing the configuration of the system in transmission of a picture signal. In FIG. 1A, a cable port 11 of the wireless HD reception adapter 1 and a cable port 3A of the sink device 3 are connected to each other by an HDMI cable 5 while a cable port 4A of the source device 4 and a cable port 21 of the wireless HD transmission adapter 2 are connected to each other by an HDMI cable 6.

The source device 4 is a picture reproducing device such as a DVD (Digital Versatile Disk) player, an HDD (Hard Disk Drive) player, etc. The source device 4 decodes picture data stored in a storage medium such as a DVD, an HDD, etc. and outputs a non-compressed picture signal from the cable port 4A.

Upon reception of the picture signal from the source device 4 through the HDMI cable 6, the wireless HD transmission adapter 2 transmits the picture signal as a non-compressed picture signal to the wireless HD reception adapter 1 by wireless communication based on wireless HD.

Upon reception of the picture signal from the wireless HD transmission adapter 2 by wireless communication based on wireless HD, the wireless HD reception adapter 1 outputs the picture signal as a non-compressed HDMI picture signal from the cable port 11. The wireless HD reception adapter 1 plays the role of a coordinator in wireless HD communication.

Upon reception of the picture signal through the cable port 11, the sink device 3 displays a picture of the picture signal on a display thereof.

The cable ports 11, 21, 3A and 4A are communication ports which are provided for wired communication based on the HDMI Standard so that HDMI cables can be attached/detached to/from these cable ports 11, 21, 3A and 4A respectively. According to the HDMI communication standard, there are provided various kinds of data communication channels such as a TMDS (Transition Minimized Differential Signaling) data line for transmitting a video/audio signal as a non-compressed signal from a sink side to a source side, a CEC line for mutual communication of control signals, a DDC line for transmitting EDID (also referred to as display device identification information) from a sink-side device to a source-side device, etc.

EDID is identification information including information such as supported display resolutions, names of supported device models and clock information. The source device 4 can recognize the capability of the sink device 3 based on EDID. EDID further includes a physical address to be allocated to a device connected to each HDMI input port. The physical address can be acquired by respective devices connected by HDMI cables to thereby construct an HDMI network including devices to which physical addresses are allocated respectively. In the HDMI network, unique physical addresses are allocated to the devices respectively. Because the physical address is information capable of identifying the network-topological position of each device, the physical address is used, for example, in routing control for changing over an active source device that transmits a picture signal to the sink device 3.

In this embodiment, the wireless HD transmission adapter 2 has EEID unique thereto (e.g. having all "FF" values) so as to allow the wireless HD reception adapter 1 recognize the wireless HD transmission adapter 2 when connected.

Wireless HD communication is a millimeter wave wireless communication method using a 60 GHz band. Wireless HD communication enables non-compressed wireless communication. Generally, a wireless communication link is established such that, while a reception adapter called a coordinator is in a waiting state, a wireless HD transmission adapter performs a pairing operation. Since connection establishing operations are generally performed in powering-on order, devices not intended by the user might be connected to each other.

Therefore, by connecting the wireless HD reception adapter 1 and the wireless HD transmission adapter 2 with an HDMI cable and by exchanging authentication information necessary for establishing connection through the cable as a paring operation, wireless connection can be selected intuitively. FIG. 1B illustrates the system in which authentication information for wireless HD communication is exchanged.

Figure 1B:
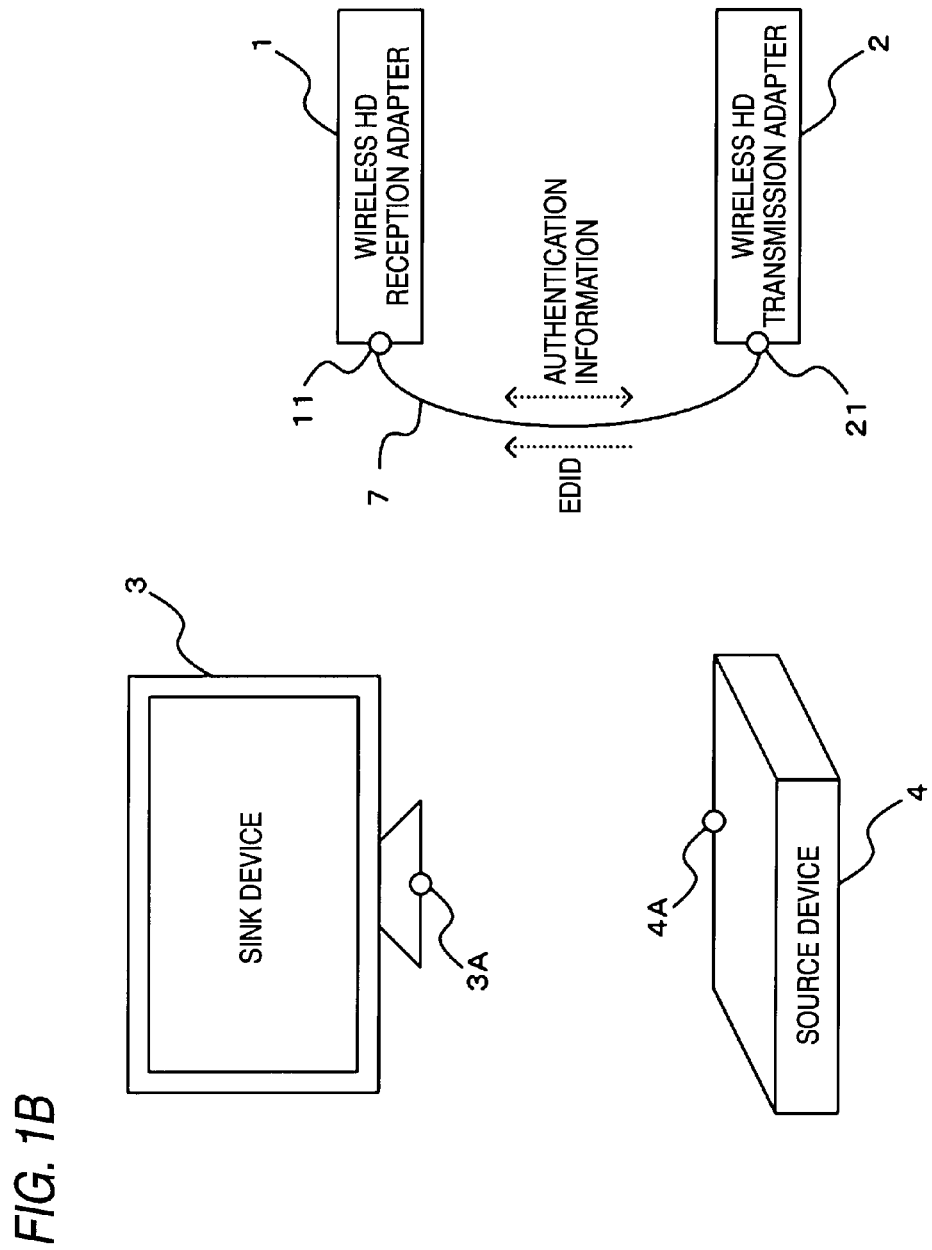

In FIG. 1B, device is not connected to the sink device 3 nor the source device 4 for communication, but the cable port 11 of the wireless HD reception adapter 1 and the cable port 21 of the wireless HD transmission adapter 2 are connected with an HDMI cable 7.

The wireless HD reception adapter 1 is generally connected to a sink-side device. When an external device is connected to the wireless HD reception adapter 1 by the HDMI cable 1, the wireless HD reception adapter 1 performs an EDID reading process to the connected external device. When it is determined that the connected external device is the wireless HD transmission adapter 2 by the read-out EDID, authentication information used in wireless HD communication is exchanged. The authentication information is exchanged, for example, by use of a CEC line.

For example, the authentication information includes information such as station ID, MAC address, vendor ID, encryption key, firmware version, etc. which are used in wireless HD communication.

When the cable 7 is plugged off after exchange of authentication information, the wireless HD reception adapter triggered by the plugging-off of the cable 7 performs wireless HD wireless communication with the wireless HD transmission adapter 2.

Figure 2:
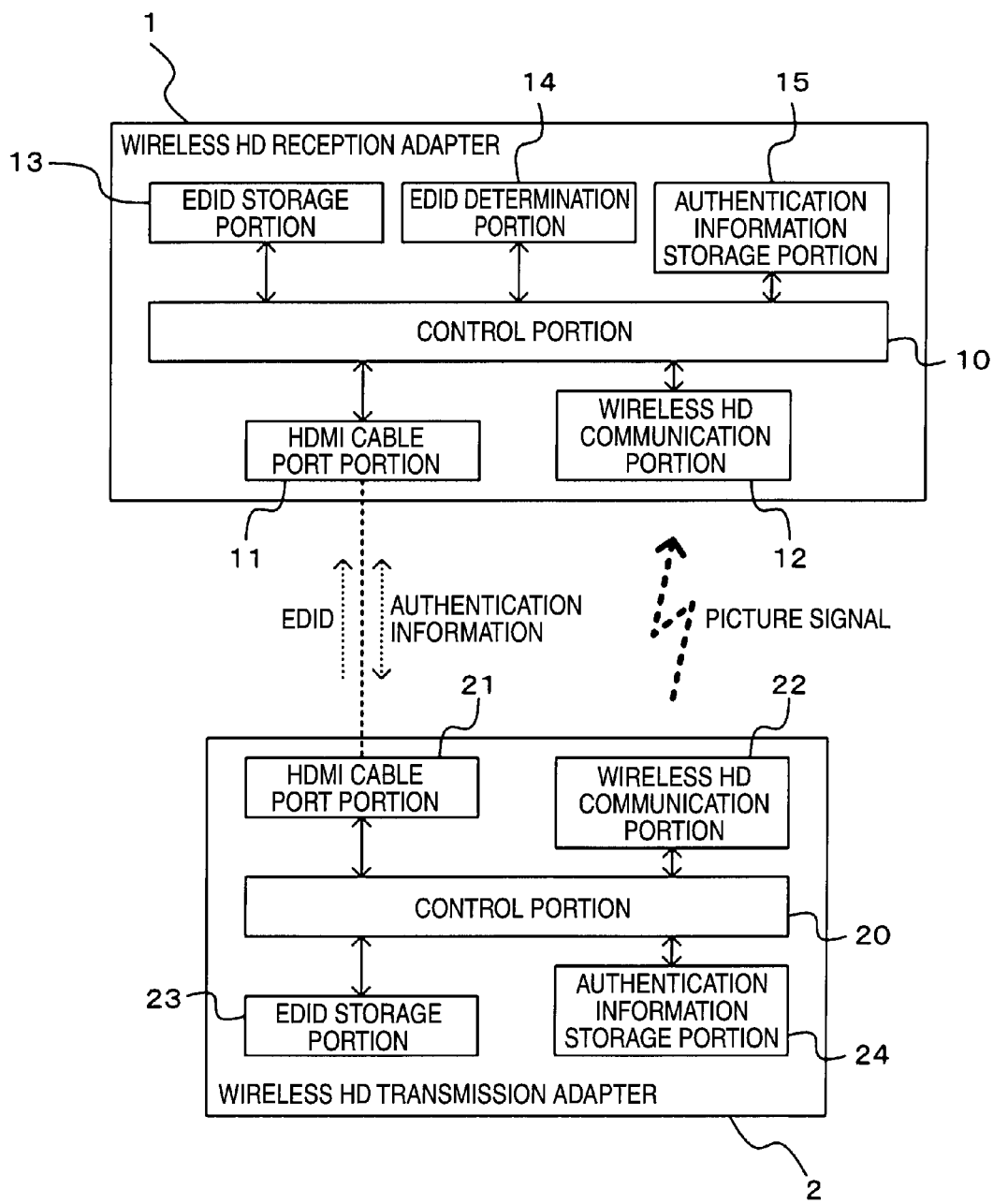
FIG. 2 illustrates a wireless communication device according to the embodiment.

The configuration of the wireless HD reception adapter 1 and the wireless HD transmission adapter 2 will be described subsequently with reference to FIG. 2. FIG. 2 illustrates the wireless HD reception adapter 1 and the wireless HD transmission adapter 2.

The wireless HD reception adapter 1 has a control portion 10, an HDMI cable port portion 11, a wireless HD communication portion 12, an EDID storage portion 13, an EDID determination portion 14, and an authentication information storage portion 15.

The control portion 10 generally controls respective constituent portions of the wireless HD reception adapter 1.

The HDMI cable port portion 11 is a communication port for HDMI wired communication. As described above, an HDMI cable 5 or 7 can be attached to the HDMI cable port portion 11. Generally, when communicating a picture signal (see FIG. 1B), the wireless HD reception adapter 1 is connected to a sink-side device. And, when an HDMI cable is attached to the HDMI cable port portion 11, the wireless HD reception adapter 1 reads EDID to acquire its own physical address.

The EDID storage portion 13 is a storage unit which stores the EDID read from the connected external device through the HDMI cable port portion 11.

The EDID determination portion 14 determines whether or not the stored EDID includes information unique to the wireless HD transmission adapter. When the EDID includes such information, the connected external device is recognized as the wireless HD transmission adapter 2 and an authentication process is performed through the HDMI cable port portion 11 for exchanging authentication information used in wireless HD communication. The exchanged authentication information is stored in the authentication information storage portion 15.

When the read-out EDID does not include information indicating the wireless HD transmission adapter, the EDID determination portion 14 recognizes the connected external device as a general sink device 3 such as a television set, a projector, etc. When the connected external device is a sink-side device, a physical address of a source-side device connected to the wireless HD transmission adapter 2 is calculated based on a physical address included in the EDID, and the wireless HD transmission adapter 2 stores the physical address of the source-side device into a memory (not shown) thereof so that the lower-side (source-side) device can read the physical address of the source-side device.

The wireless HD communication portion 12 is a communication module for receiving a picture signal transmitted from the wireless HD transmission adapter 2. When the wireless HD communication portion 12 performs wireless HD communication with the wireless HD transmission adapter 2, the authentication information which is stored in the authentication information storage portion 15 after being exchanged with the wireless HD transmission adapter 2 through the HDMI cable port portion 11 is used.

The configuration of the wireless HD transmission adapter 2 will be described next. The wireless HD transmission adapter 2 has a control portion 20, an HDMI cable port portion 21, a wireless HD communication portion 22, an EDID storage portion 23, and an authentication information storage portion 24.

The control portion 20 generally controls respective constituent portions of the wireless HD transmission adapter 2.

The HDMI cable port portion 21 is a communication port for HDMI wired communication. As described above, an HDMI cable 6 or 7 can be attached to the HDMI cable port portion 21. When the wireless HD transmission adapter 2 is connected to the source device 4, the wireless HD transmission adapter 2 can receive a picture signal from the source device 4. When the wireless HD transmission adapter 2 is connected to the wireless HD reception adapter 1, EDID of the wireless HD transmission adapter 2 is read by the wireless HD reception adapter 1 so that the wireless HD reception adapter 1 can recognize the wireless HD transmission adapter 2 to thereby exchange authentication information used in wireless HD communication with the wireless HD transmission adapter 2 through the HDMI cable port portion 21.

The authentication information storage portion 24 is a recording medium for storing the exchanged authentication information.

The wireless HD communication portion 22 is a communication module which transmits a picture signal to the wireless HD reception adapter 1. Incidentally, the authentication information stored in the authentication information storage portion 24 is used in the wireless HD communication.

The EDID storage portion 23 is a recording medium such as an EEPROM which stores EDID to be read by the wireless HD reception adapter 1 through the HDMI cable port portion 21.

Processing between the wireless HD reception adapter 1 and the wireless HD transmission adapter 2 will be described with reference to FIG. 3.

First, the user connects the HDMI cable port portion 11 of the wireless HD reception adapter 1 and the HDMI cable port portion 21 of the wireless HD transmission adapter 2 with the HDMI cable 7 (steps A101 and B101).

When the HDMI cable 7 is attached to the HDMI cable port portion 11, the wireless HD reception adapter 1 detects a high signal level on an HPD (Hot Plug Detection) line (step A102) to thereby find that the HDMI cable port portion 11 is connected to another HDMI device.

With the step A102, the wireless HD reception adapter 1 reads EDID from the wireless HD transmission adapter 2 as the connected external device through the DDC line (step A103).

On this occasion, the wireless HD transmission adapter 2 transmits the EDID stored in the EDID storage portion 23 to the wireless HD reception adapter 1 in accordance with a request given from the wireless HD reception adapter 1 (step B102). The EDID includes unique information (e.g. all "FF" values) indicating that the device is a wireless HD transmission adapter 2 (device capable of transmitting a picture signal by wireless HD communication) to be recognized by the wireless HD reception adapter 1.

The EDID determination portion 14 of the wireless HD reception adapter 1 determines based on the read EDID whether the connected external device is the wireless HD transmission adapter 2 or not (step A104). When the connected external device is not the wireless HD transmission adapter 2 (No in step A104), the wireless HD reception adapter 1 regards the connected external device as a general HDMI device, recognizes the connected external device as a sink-side device (e.g. the sink device 3) and performs general HDMI communication (step A105).

When the EDID determination portion 14 determines that the connected external device is the wireless HD transmission adapter 2 (Yes in step A104), the wireless HD reception adapter 1 triggered by the determination exchanges wireless HD authentication information with the wireless HD transmission adapter 2 (steps A106 and B103). For example, the exchange of authentication information can be performed by use of the CEC line.

The authentication information includes information such as station ID which is allocated to the wireless HD transmission adapter 2 by the wireless HD reception adapter 1 as a coordinator in wireless HD wireless communication, and other authentication information such as MAC address, vendor ID, encryption key, firmware version, etc.

When the user plugs off the HDMI cable 7 (steps A107 and B104) after exchange of authentication information, the wireless HD reception adapter 1 and the wireless HD transmission adapter 2 triggered by the plugging-off of the HDMI cable 7 are wirelessly connected to each other for wireless HD communication (steps A108 and B105). As a result, when the two devices are connected as shown in FIG. 1A, a picture signal can be transmitted between the two devices.

Incidentally, the wireless HD transmission adapter 2 and the wireless HD reception adapter 1 which have been authenticated by wired communication establish only one wireless communication link. For example, even if there is another wireless HD transmission adapter or another wireless HD reception adapter around the wireless HD reception adapter 1 and/or the wireless HD transmission adapter 2, the wireless HD reception adapter 1 or the wireless HD transmission adapter 2 does not establish any wireless communication link with the other adapter. In this manner, the wireless HD transmission adapter and the wireless HD reception adapter to be connected to each other can be selected by the user in advance, so that a wireless communication link can be prevented from being established between unintended wireless adapters.

As described above, according to the embodiment, when a picture signal is wirelessly transmitted, authentication information for the transmission is exchanged by pairing in HDMI wired communication. Accordingly, while authentication information can be exchanged safely and intuitively, the user can recognize the partner device clearly and can achieve an intuitive operation.

Moreover, the exchange of authentication information is triggered by reading of EDID. Since the EDID is read at the start of HDMI communication, the user can start an authentication process without pushing any switch or the like when information indicating the wireless HD communication adapter is embedded in the EDID. When such information is not included in the EDID, general HDMI communication can be performed. The user's operation is simplified.

What is claimed is:

1. A sink-side wireless communication device being wiredly connectable with a sink-side wired communication device and wirelessly communicable with a source-side wireless communication device that is wiredly connectable with a source-side wired communication device, the sink-side wireless communication device comprising:
   a memory;
   a cable port;
   a read module configured to read display device identification information from an external device that is connected to the cable port through a cable, the display device identification information being compatible with a communication method using the cable;
   a determination module configured to determine whether the external device is the source-side wireless communication device or not based on the acquired display device identification information;
   a wired physical address processing module configured to determine, if the determination module determines that the external device is not the source-side wireless communication device, that the external device is the sink-side wired communication device and to then calculate a physical address of the source-side wired communication device based on a physical address included in the display device identification information;

an authentication module configured to perform, if the determination module determines that the external device is the source-side wireless communication device, an authentication process with the source-side wireless communication device being wiredly connected to the sink-side wireless communication device and to then store authentication information acquired through the authentication process; and a wireless communication module configured to perform a wireless communication with the source side wireless communication device that is wiredly connected with the source-side wired communication device, in a state where the sink-side wired communication device is wiredly connected to the cable port, based on the stored authentication information.

2. The sink-side wireless communication device of claim 1, wherein the sink-side wireless communication device performs the wireless communication with the source-side wireless communication device that had been subjected to the authentication process while being wiredly connected to the cable port, and does not perform the wireless communication with another wireless communication device that had not been subjected to the authentication process while being wiredly connected to the cable port.

3. The sink-side wireless communication device of claim 1, wherein, in the authentication process, the sink-side wireless communication device allocates the authentication information to be used in the wireless communication to the source-side wireless communication device.

* * * * *